United States Patent
Nyström et al.

(10) Patent No.: US 6,299,852 B1
(45) Date of Patent: Oct. 9, 2001

(54) PROCESS FOR PRODUCTION OF A CHEMICAL COMPOUND

(75) Inventors: Mats Nyström, Ytterby; Johan Wanngård, Angered; Wolfgang Herrmann, Göteborg, all of (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/217,586

(22) Filed: Dec. 22, 1998

Related U.S. Application Data
(60) Provisional application No. 60/068,440, filed on Dec. 22, 1997.

(30) Foreign Application Priority Data

Dec. 22, 1997 (EP) .................................................. 97850180

(51) Int. Cl.⁷ .................................................. C01B 15/01
(52) U.S. Cl. ............................................................. 423/584
(58) Field of Search ............................................. 423/584

(56) References Cited

U.S. PATENT DOCUMENTS

| | | |
|---|---|---|
| 2,368,640 | 2/1945 | Cook et al. . |
| 4,661,337 | 4/1987 | Brill . |
| 4,681,751 | 7/1987 | Gosser . |
| 4,772,458 | 9/1988 | Gosser et al. . |
| 5,128,114 | 7/1992 | Schwartz . |
| 5,180,573 | 1/1993 | Hiramatsu et al. . |
| 5,194,242 * | 3/1993 | Paoli ..................... 423/584 |
| 5,338,531 | 8/1994 | Chuang et al. . |
| 5,496,532 * | 3/1996 | Monzen et al. ............ 423/584 |
| 5,500,202 | 3/1996 | Germain et al. . |
| 5,641,467 * | 6/1997 | Huckins .............. 423/584 |

FOREIGN PATENT DOCUMENTS

| | | |
|---|---|---|
| 140403 | 8/1930 | (CH) . |
| 558 431 | 9/1932 | (DE) . |
| 498 166 | 8/1992 | (EP) . |
| 878 235 | 11/1998 | (EP) . |
| WO 97/32811 | 9/1997 | (WO) . |
| WO 97/32812 | 9/1997 | (WO) . |

* cited by examiner

*Primary Examiner*—Wayne Langel
(74) *Attorney, Agent, or Firm*—David J. Serbin

(57) ABSTRACT

The invention concerns a process of continuously producing hydrogen peroxide by direct reaction between hydrogen and oxygen in a gaseous reaction mixture in contact with a catalyst maintained in a reactor, wherein a gaseous reaction mixture containing hydrogen and oxygen is supplied to the reactor through an inlet and hydrogen peroxide enriched gas is withdrawn from the reactor through an outlet. According to the invention the temperature difference in the gaseous reaction mixture in contact with the catalyst between a position just after the inlet to the reactor and a position at the outlet of the reactor is maintained below about 40° C.

17 Claims, 1 Drawing Sheet

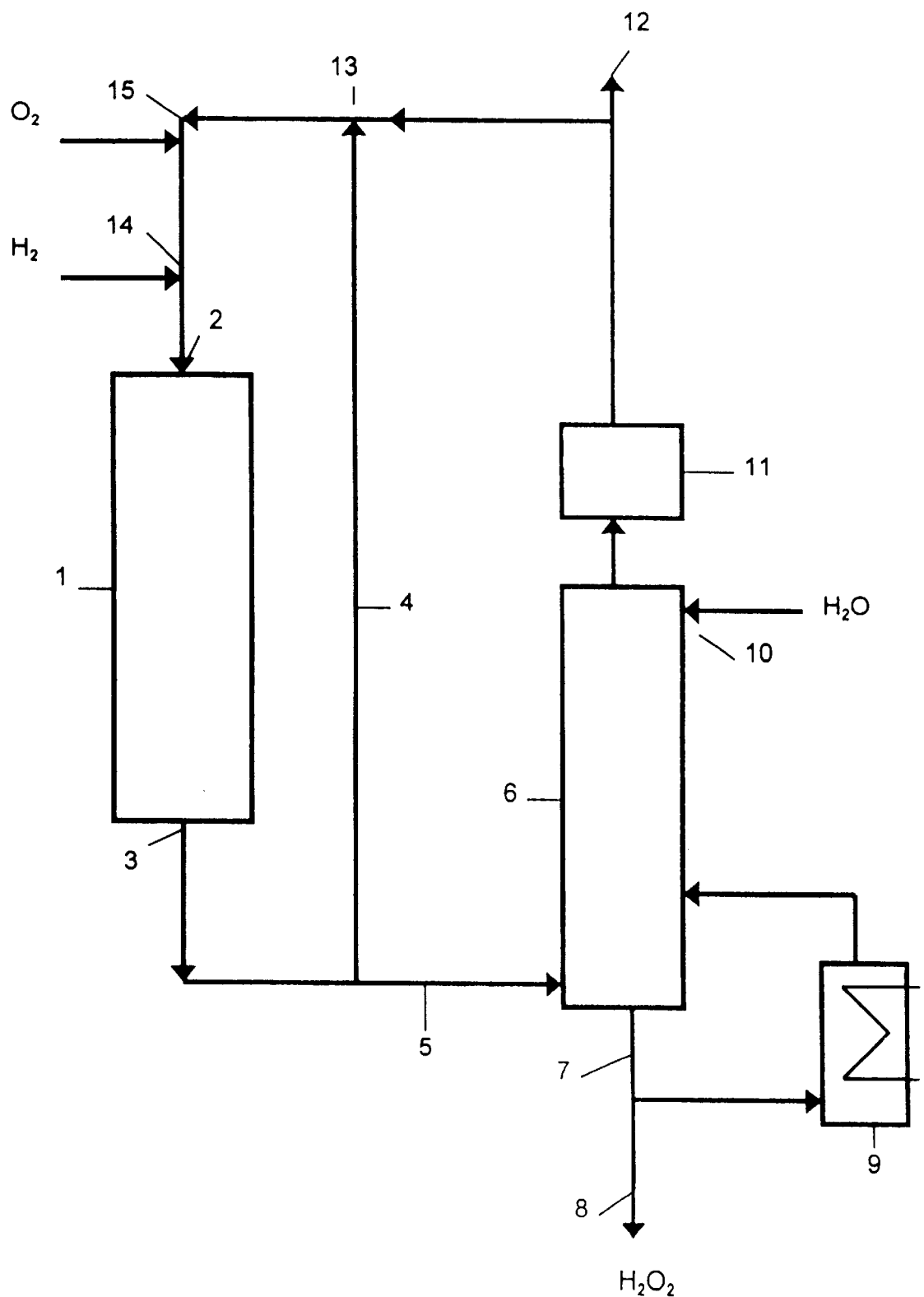

PROCESS FOR PRODUCTION OF A CHEMICAL COMPOUND

RELATED APPLICATIONS

This application claims priority from U.S. Provisional Patent Application No. 60/068440, filed Dec. 22, 1997, which is incorporated herein by reference.

BACKGROUND OF THE INVENTION

The present invention relates to a process of producing hydrogen peroxide by direct reaction between hydrogen and oxygen in the presence of a catalyst, to form hydrogen peroxide gas, a new catalyst suitable for the process and preparation thereof.

Production of hydrogen peroxide by direct reaction between hydrogen and oxygen can be performed by contacting hydrogen and oxygen with a catalyst in an aqueous reaction medium as described in, for example, the U.S. Pat. Nos. 4,681,751, 4,772,458, 5,180,573, 5,128,114 and 5,338,531, as well as J. R. Kosak (DuPont), "A Novel Fixed Bed Catalyst for the Direct Combination of $H_2$ and $O_2$ to $H_2O_2$", Chem. Ind. (Dekker), 1995, Vol. 62, Catalysis of Organic Reactions.

However, the formation of hydrogen peroxide is rather slow and it is hard to obtain high concentrations of hydrogen peroxide. These problems are assumed to be due to the facts that only low amounts of the reactants can be dissolved in the reaction medium and that the same catalyst that promotes formation of hydrogen peroxide also catalyses its decomposition into water and oxygen.

U.S. Pat. No. 5,500,202 discloses production of hydrogen peroxide in a reactor, wherein hydrogen and oxygen are reacted in a gaseous state at the surface of a solid catalyst and the hydrogen peroxide formed is dissolved in a liquid trickling through the reactor. However, also in this process only hydrogen peroxide solutions of low concentration and low purity can be obtained.

DE patent 558431 discloses production of hydrogen peroxide from oxygen and hydrogen in gas phase at a temperature below the freezing point and a pressure of at least 100 atm. These extreme conditions render the process very expensive commercially unattractive.

CH patent 140403 discloses a similar method but fails to suggest any suitable temperature, while U.S. Pat. No. 2,368,640 recommends operation at a temperature between 400 and 650° C.

WO 97/32812 discloses production of hydrogen peroxide by contacting hydrogen and oxygen in gas phase with a catalyst at a temperature up to 100° C. and a pressure up to 100 bar. Although it is possible to achieve a high reaction rate it has, however, been found that this process cannot readily be operated under stable conditions, particularly if it is desirable to obtain hydrogen peroxide at high concentration.

BRIEF DESCRIPTION OF THE DRAWING

For a full understanding of the invention, the following detailed description should be read in conjunction with the drawing, which is a schematic of a preferred embodiment of the invention.

DETAILED DESCRIPTION OF THE PREFERRED EMBODIMENTS

The object of the present invention is to provide a process for production of hydrogen peroxide from hydrogen and oxygen which enables operation under stable conditions and preferably also formation of the hydrogen peroxide in high concentrations.

It has been found that the reaction between hydrogen and oxygen is highly exothermic and that the reaction rate increases rapidly with the temperature. Therefore, it is very difficult to operate the process under stable conditions and avoid uncontrolled fluctuations of the reaction, particularly if a high concentration of hydrogen peroxide is to be obtained. According to the invention it has been found that stable operation is possible if the temperature difference between incoming and outgoing gas from the reactor is minimised.

Thus, the invention concerns a process of continuously producing hydrogen peroxide by direct reaction between hydrogen and oxygen in a gaseous reaction mixture in contact with a catalyst maintained in a reactor wherein, a gaseous reaction mixture containing hydrogen and oxygen is supplied to the reactor through an inlet and hydrogen peroxide enriched gas is withdrawn from the reactor through an outlet. The temperature difference in the gaseous reaction mixture in contact with the catalyst between a position just after the inlet to the reactor and a position at the outlet of the reactor is maintained below about 40° C., preferably below 25° C., most preferably below 15° C. Although it in principle is possible to operate the reactor under substantially isothermic conditions, it is preferred to maintain a temperature of the reaction mixture at the outlet that is at least about 2° C., most preferably at least about 5° C. higher than the temperature at the inlet of the reactor. Suitably the temperature of the reaction mixture is maintained above the freezing point of any component therein, most preferably above −10° C. The pressure is suitably maintained below 100 bar, preferably from about 3 to about 70 bar, most preferably from about 6 to about 50 bar.

According to the invention it has also been found that unless the temperature is sufficiently high only very low concentrations of hydrogen peroxide can be dissolved in the gas stream and it is then necessary to design the equipment for a very high gas flow. Although it is possible to operate the process at low temperatures of the reaction mixture in contact with the catalyst, for example from about 0 to about 100° C. or from about 20 to about 80° C., it has been found favourable to maintain a temperature above 105° C., preferably above 110° C., particularly above 115° C., and most preferably above 120° C. It has also surprisingly been found that the selectivity of the reaction is fully satisfactory also at temperatures above 105° C. For safety reasons the temperature is suitably maintained below about 200° C., preferably below about 160° C. It is normally possible to operate without supplying heat from external sources but only utilising the heat produced by the reaction between hydrogen and oxygen.

The process is suitably carried out by continuously feeding hydrogen and oxygen into a gaseous reaction mixture flowing through the reactor containing a catalyst and obtaining a hydrogen peroxide enriched gas at the outlet of the reactor. The oxygen may be supplied as substantially pure gas or in the form of an oxygen containing gas such as air. Preferably the reaction mixture contains from about 2 to about 97 mol % of oxygen most preferably from about 4 to about 70 mol %. It has been found that the safety of the process increases if the oxygen concentration is maintained below about 5 mol %. High hydrogen concentration favours the hydrogen peroxide production but may also involve safety problems. Therefore, it is preferred to operate at a hydrogen concentration in the reaction mixture below the detonation limit at about 15 mol %, and most preferred to operate below the explosion limit at about 5 mol %. The minimum concentration of hydrogen in the reaction mixture in the reactor is suitably about 1 mol %, preferably about 2 mol %. If the reaction mixture runs out of hydrogen there is a risk for oxidation and passivation of the catalyst. The process is particularly safe if both the hydrogen concentration and the oxygen concentration are below about 5 mol %. It is preferred to operate so to obtain a hydrogen peroxide enriched gas containing more than 0.2 mol %, preferably more than 0.3 mol %, most preferably more than 0.4 mol % of hydrogen peroxide. For safety reasons it is preferred not to exceed about 5 mol % of hydrogen peroxide in the gas. Preferably the process is operated at a limited conversion degree of hydrogen in the reactor to obtain a difference in the percentage of hydrogen in the reaction mixture at the inlet compared to the outlet of the reactor below about 0.7 mol %, most preferably below about 0.4 mol %, but preferably at least about 0.01 mol %, most preferably at least about 0.07 mol %. For example, if the hydrogen concentration at the inlet of the reactor is 3.50 mol % the concentration at the outlet is preferably from 2.8 to 3.49 mol %, most preferably from 3.1 to 3.43 mol %. In addition to hydrogen, oxygen and hydrogen peroxide the reaction mixture normally contains nitrogen and/or other substantially inert gases.

The catalyst is preferably solid and preferably comprises a catalytically active material deposited on a support. It may be in the form of a fixed particle bed, for example with an average particle size from about 0.1 to about 10 mm, preferably from about 0.3 to about 5 mm, in the form of sections of monoliths, or as a fluidized bed for example with an average particle size from about 0.02 to about 1 mm, preferably from about 0.1 to about 0.5 mm. The particles can be spherical or non-spherical and the size is defined as the smallest dimension cross the particle. It is also possible to use a catalyst in the form of a net or a foil.

The process suitably comprises a step of treating at least a portion of the hydrogen peroxide enriched gas from the outlet of the reactor to recover hydrogen peroxide and preferably also cool the gas and then recirculating it back to the reactor. The total pressure of the gas during this treatment should preferably deviate with less than about 25%, most preferably with less than about 15% from total pressure of the gas in the reactor which saves energy and investment costs for compressing the hydrogen peroxide enriched gas. Most preferably the treatment is performed at substantially the same pressure as maintained in the reactor. The hydrogen peroxide may be recovered from the gas by cooling condensation and/or absorption in any suitable solvent such as water or an aqueous hydrogen peroxide solution. This liquid may contain small amounts of conventional additives in order to prevent decomposition of hydrogen peroxide. Preferably the gas is treated with an aqueous medium wherein absorption of hydrogen peroxide and cooling occurs simultaneously. A high degree of cooling enables production of more concentrated hydrogen peroxide solution and the temperature difference between treated and untreated gas is preferably from about 20 to about 120° C., most preferably from about 40 to about 100° C. Normally it is possible to obtain an aqueous solution containing up to about 90 weight %, preferably from about 20 to about 70 weight % of hydrogen peroxide which eliminates the need for distillation or other expensive steps of further concentrating the product.

In on-site production of hydrogen peroxide it is possible dispense with the above recovery step and react hydrogen peroxide gas with any suitable agent directly in a medium where it is intended to be used.

It has been found possible to maintain a sufficiently low temperature difference within the reaction mixture by leading thermal energy produced during the reaction between hydrogen and oxygen from the hydrogen peroxide enriched gas at the outlet of the reactor to the reaction mixture before it enters or when it just has entered the reactor. This can be achieved in several ways as will be described below.

The sole FIGURE schematically shows a preferred embodiment of the invention.

In a preferred embodiment, enabling both stable operation of the process and production of hydrogen peroxide at high concentrations without using equipment of extremely large dimensions, the process comprises a step of recirculating a portion of the hydrogen peroxide enriched gas from the outlet of the reactor, preferably from about 40 to about 95%, most preferably from about 60 to about 90%, back to the reactor without recovering hydrogen peroxide therefrom and preferably without cooling the gas, thereby leading thermal energy produced during the reaction back for heating the reaction mixture entering the reactor. The recirculating gas may, if necessary, be cooled with an external cooling medium, but normally it is preferred just to mix that gas with a portion of or all the cooled gas from a hydrogen peroxide recovery step to form a reaction mixture and then introduce that mixture into the reactor. As an alternative or as a complement, cooled gas from a hydrogen peroxide recovery step may also be added to the reaction mixture by introducing it directly into the reactor at one or several feed points along the reactor and/or between separate sections of the reactor. Fresh hydrogen and oxygen or oxygen containing gas may be added into any of the gas streams, although addition to the reaction mixture just before it enters the reactor is preferred.

In another embodiment cooling can be arranged by letting the gas pass through a sequence of modules each comprising a catalyst bed and one or several of the following functions: cooling zone (direct or indirect), absorption zone and feed zone of hydrogen and/or oxygen. The latter function serves the purpose of reducing the total circulation gas flow. Suitably the number of modules are from 2 to about 100, preferably from about 4 to about 15 and the gas from the last module is preferably recirculated back to the first one.

It has also been found that use of a fluidized bed of catalyst particles facilitates stable operation since part of the heated particles in the fluidized bed are recirculating within the reactor to lead thermal energy from the hydrogen peroxide enriched gas at the outlet to the cooler reaction mixture close to the inlet of the reactor. It is easy to maintain a substantially uniform temperature within the reaction mixture even if the reaction mixture entering the reactor is significantly cooler than the reaction mixture already in contact with the catalyst. It is possible to operate a fluidized bed at a higher conversion degree of hydrogen than other types of reactors. Preferably the difference in the percentage of hydrogen in the reaction mixture at the inlet compared to the outlet of the reactor is from about 0.3 to about 3 mol %, most preferably about 0.6 to about 2 mol %.

Low temperature gradients within the reaction mixture can also be achieved in a reactor having a fixed catalyst bed made up of particles or sections of monoliths if the bed has sufficiently high heat conductivity for leading thermal energy back from the part of the bed close to the outlet of the reactor back to the beginning of the bed, particularly if the reactor is comparatively short, for example below about 0.5 m, preferably below about 0.1 m. Also these kinds of reactors can be operated at a comparatively high conversion degree of hydrogen. Preferably, the difference in the percentage of hydrogen in the reaction mixture at the inlet compared to the outlet of such a short reactor is from about 0.3 to about 3 mol %, most preferably about 0.6 to about 2 mol % compared to reactor inlet.

Besides adiabatic operation, cooling can also be achieved by releasing reaction heat from the catalyst to the adjacent gas stream or cooling by deposition of the catalyst on the wall of a heat transfer surface, directly chilled with a circulating cooling medium such as water, e.g. from the other side. This concept offers good temperature control.

The reactor may, if necessary, comprise means for cooling the gaseous reaction mixture with an external cooling medium. It is then preferred to maintain a temperature difference between the cooling medium and the reaction mixture below about 40° C., preferably below about 25° C., most preferably below about 15° C. If necessary, it is also possible to further heat the reaction mixture before it enters the reactor.

The catalytically active material may comprise one or more precious metals, preferably selected from group VIII metals or gold, most preferably palladium, platinum or mixtures thereof. Most preferably the active material is a mixture of from about 90 to 100% by weight of palladium and from 0 to about 10% by weight of platinum. The catalytically active material may also be a less active material such as nickel, which increases the selectivity of the reaction.

It has been found that a low total surface area of the catalyst support favours the selectivity of the reaction. Suitably the BET area of the support is below about 80 m$^2$ per ml reactor volume, preferably below about 20 m$^2$ per ml reactor volume, most preferably below about 5 m$^2$ per ml reactor volume, and particularly preferably below about 1 m$^2$ per ml reactor volume. It is also suitable to arrange the catalytically active material without such a catalyst support. Preferred arrangements of the catalytically active material are in the form of beds of porous particles, porous metal foams and wire cloth. In order to obtain sufficiently high production the area of the catalytically active material suitably exceeds about 0.00005 m$^2$, preferably 0.01 m$^2$, preferably about 0.2 m$^2$ per ml reactor volume as measured by chemisorption of carbon monoxide or any other suitable gas. The term "reactor volume" refers to the total volume of the reactor including the space occupied by the catalyst.

A great many materials may be used for the support such as silica, silicate, alumina, carbon, aluminium silicate such as zeolite, carbonates of alkaline earth metals such as magnesium, calcium, barium or strontium, oxides of magnesium, aluminium, titanium or zirconium, or carbides of magnesium, silicon, aluminium, titanium, zirconium, ceramic materials or organic polymers. Preferred organic polymers contain hydroxy groups, carboxylic groups, sulfonic groups, amine groups, quaternary ammonium groups and/or other polar groups. Preferred support materials are selected from glass, quartz, substantially pure silica or substantially pure aluminium oxide. Low surface area supports are preferred such as non-porous beads or materials having a surface area below about 20 m$^2$ per gram, most preferably below about 5 m$^2$ per gram. If the support is porous it is preferred that the pores are fairly large and preferably pores with a diameter exceeding about 10 nm, most preferably exceeding about 20 nm constitutes more than about 50%, most preferably about 80% of the total pore volume.

The catalyst can be prepared with any known method, such as those described in EP 878235 and the earlier mentioned U.S. Pat. No. 5,338,531 and J. R. Kosak (DuPont), "A Novel Fixed Bed Catalyst for the Direct Combination of $H_2$ and $O_2$ to $H_2O_2$", Chem. Ind. (Dekker), 1995, Vol. 62, Catalysis of Organic Reactions.

In order to improve the selectivity it may be favourable to dope the catalyst surface with a mineral acid such as HCl, HBr, HI, $H_3PO_4$, $H_2SO_4$ or mixtures thereof and, if necessary, continuously add small amounts of the acid or acids to the gas stream flowing into the reactor, for example in quantities equal to losses of these additives leaving the reactor with the exit gas.

The invention will now be further described in connection to the FIGURE schematically showing a preferred embodiment.

A gaseous reaction mixture having a preferred temperature of about 110–130° C., a preferred absolute pressure of about 13–17 bars and preferably comprising about 40–60 mol % oxygen, about 3–4 mol % hydrogen and about 0.7–1.1 mol % hydrogen peroxide, the balance preferably being nitrogen and/or other inert gases, is introduced into a reactor 1 at an inlet 2. In the reactor 1 the reaction mixture is contacted with a catalyst wherein oxygen and hydrogen reacts to hydrogen peroxide. At an outlet 3 gas preferably containing about 0.8–1.2 mol % hydrogen peroxide leaves the reactor 1 and is then divided into one recirculation line 4 and one line 5 leading to a combined cooler and absorber 6. Preferably about 10–20% of the gas from the reactor 1 is transferred to the absorber 6 in which it is contacted with water absorbing the hydrogen peroxide while unreacted hydrogen, oxygen and inert gases pass through the absorber 6. An aqueous solution of hydrogen peroxide is circulating through line 7 and a cooler 9. A part of the circulating hydrogen peroxide solution is withdrawn as a product 8 while the remaining solution is recirculated to the absorber 6. Fresh water 10 is supplied at the top of the absorber 6. The gas passing through the absorber 6 is preferably cooled therein to about 40–60° C. and is then conducted through a demister 11. Finally the cooled gas is mixed at a mixing point 13 with the gas from the circulation line 4 and supplied with make up hydrogen 14 and oxygen 15 to form a reaction mixture which is introduced into the reactor 1 at the inlet 2. If any inert gas is fed together with the make up hydrogen 14 or oxygen 15 a corresponding amount of gas should be withdrawn through line 12 situated after the demister 11 but before the mixing point 13.

The process is further described through the following Example, which however does not limit the scope of the invention.

EXAMPLE

A catalyst was prepared by impregnating glass wool with palladium chloride and hexachloro platinic acid followed by reduction in hydrogen at 300° C. 50 mg of the palladium impregnated glass wool was mixed with 250 mg none-impregnated glass wool and placed in a cylindrical reactor (6.3 mm inner diameter) to form a 30 mm long fibre bed supported by a disk with 0.2 µm openings. A gas mixture of 3 mol % hydrogen, 50 mol % oxygen and 47 mol % nitrogen was bubbled through an aqueous bath containing 1 wt % $H_2SO_4$ and 20 wt ppm NaBr at 30 N liter/h and then fed to the reactor. The gas at the exit of the reactor was bubbled through an aqueous bath of 1 wt % $H_2SO_4$ to absorb the hydrogen peroxide therein. After 100 minutes operation at an absolute pressure of 20 bars and a temperature of about 80–100° C. 4.4 mg hydrogen peroxide had formed.

What is claimed is:

1. A process of continuously producing hydrogen peroxide by direct reaction between hydrogen and oxygen in a gaseous reaction mixture in contact with a catalyst maintained in a reactor, comprising the steps of:
   (a) supplying to the reactor via an inlet a gaseous reaction mixture comprising hydrogen and oxygen;
   (b) contacting the gaseous reaction mixture with a catalyst in the reactor and reacting the gaseous reaction mixture to form a hydrogen peroxide enriched gas;
   (c) withdrawing the hydrogen peroxide enriched gas from the reactor via an outlet; and
   (d) leading thermal energy produced during the reaction between hydrogen and oxygen from the hydrogen peroxide enriched gas at the outlet of the reactor to the reaction mixture before it enters or when it just has entered the reactor;
wherein the temperature differential in the gaseous reaction mixture in contact with the catalyst at a point just after said inlet and at said outlet is maintained below 25° C.

2. A process as claimed in claim 1, wherein the temperature difference in the gaseous reaction mixture in contact with the catalyst between a position just after the inlet to the reactor and a position at the outlet of the reactor is maintained below 15° C.

3. A process as claimed in claim 1, wherein the process comprises the steps of treating at least a portion of the hydrogen peroxide enriched gas from the outlet of the reactor for recovering hydrogen peroxide, cooling the gas and then recirculating it back to the reactor.

4. A process as claimed in claim 1, wherein in the treatment for recovering hydrogen peroxide the total pressure of the gas deviates with less than about 25% from the total pressure of the gas in the reactor.

5. A process as claimed in claim 1, wherein the gaseous reaction mixture is in contact with a catalyst in the form of a fluidized bed in the reactor.

6. A process as claimed in claim 1, wherein the process is operated to obtain a hydrogen peroxide enriched gas containing more than 0.2 mol % of hydrogen peroxide.

7. A process as claimed in claim 1, wherein the temperature of the reaction mixture in contact with the catalyst is maintained above 105° C.

8. A process as claimed in claim 7, wherein the temperature of the reaction mixture is maintained above about 110° C.

9. A process as claimed in claim 1, wherein the temperature of the reaction mixture in contact with the catalyst is maintained below about 160° C.

10. A process as claimed in claim 1, wherein the oxygen concentration in the reaction mixture is maintained below about 5 mol %.

11. A process as claimed in claim 1, wherein the hydrogen concentration in the reaction mixture is maintained below about 5 mol %.

12. A process as claimed in claim 1, wherein the gaseous reaction mixture is in contact with a solid catalyst comprising a catalytically active material deposited on a support, wherein the BET area of said support is below about 80 $m^2$ per ml reactor volume.

13. A process as claimed in claim 12, wherein the BET area of said support is below about 20 $m^2$ per ml reactor volume.

14. A process as claimed in claim 1, wherein the gaseous reaction mixture is in contact with a solid catalyst comprising a catalytically active material deposited on a support selected from the group consisting of glass, pure silica and pure aluminum oxide.

15. A process of continuously producing hydrogen peroxide by direct reaction between hydrogen and oxygen in a gaseous reaction mixture in contact with a catalyst maintained in a reactor, comprising the steps of:
   (a) supplying to the reactor via an inlet a gaseous reaction mixture comprising hydrogen and oxygen;
   (b) contacting the gaseous reaction mixture with a catalyst in the reactor and reacting the gaseous reaction mixture to form a hydrogen peroxide enriched gas;
   (c) withdrawing the hydrogen peroxide enriched gas from the reactor via an outlet; and
   (d) recirculating a portion of the hydrogen peroxide enriched gas from the outlet of the reactor back to the reactor without recovering hydrogen peroxide therefrom, and thereby leading thermal energy back for heating the reaction mixture entering the reactor; and
wherein the temperature differential in the gaseous reaction mixture in contact with the catalyst at a point just after said inlet and at said outlet is maintained below 40° C.

16. A process as claimed in claim 15, wherein the process comprises a step of mixing hydrogen peroxide enriched gas recirculated without recovering hydrogen peroxide therefrom with cooled gas from a hydrogen peroxide recovery step to form a reaction mixture and supplying that mixture to the reactor.

17. A process as claimed in claim 15, wherein the process comprises a step of adding cooling gas from a hydrogen peroxide recovery step to the reaction mixture by introducing it directly into the reactor at one or several feed points along the reactor and/or between separate sections of the reactor.

* * * * *